United States Patent
Güssefeld

[11] 3,978,734
[45] Sept. 7, 1976

[54] METHOD FOR RECORDING STATIONARY FLOW PATTERNS AT BOUNDARY SURFACES

[75] Inventor: Horst Güssefeld, Uttenreuth, Germany

[73] Assignee: Siemens Aktiengesellschaft, Munich, Germany

[22] Filed: Sept. 11, 1975

[21] Appl. No.: 612,451

[30] Foreign Application Priority Data
Sept. 23, 1974 Germany............................ 2545398

[52] U.S. Cl.............................................. 73/432 R
[51] Int. Cl.². ........................................ G01M 1/00
[58] Field of Search .............. 76/86, 105, 147, 148, 76/432

[56] References Cited
UNITED STATES PATENTS

| | | |
|---|---|---|
| 3,753,652 | 8/1973 | Gassmann et al.................... 73/148 |
| 3,774,225 | 11/1973 | Kimmel................................ 73/147 |
| 3,787,874 | 1/1974 | Urban.................................. 73/147 |
| 3,890,835 | 6/1975 | Dötzer................................. 73/147 |
| 3,913,393 | 10/1975 | Facy................................... 73/147 |

Primary Examiner—S. Clement Swisher
Attorney, Agent, or Firm—Kenyon & Kenyon Reilly Carr & Chapin

[57] ABSTRACT

Stationary liquid flow patterns at boundary surfaces are recorded by coating the boundary surface with a layer of lacquer which can be attacked and exposing the boundary surface to a flow of liquid containing a substance which attacks the lacquer layer. In accordance with the preferred embodiments a photo-resist lacquer is sprayed onto the surfaces and etching substance dissolved in a liquid which is caused to flow past the boundary surface making possible a visible recording of the formation of eddies at obstacles.

4 Claims, 2 Drawing Figures

METHOD FOR RECORDING STATIONARY FLOW PATTERNS AT BOUNDARY SURFACES

BACKGROUND OF THE INVENTION

This invention relates to the measurement of fluid flow patterns at boundary surfaces in general and more particularly to improved method for recording stationary flow patterns at such boundary surfaces.

An important branch of fluidics deals with the processes of circulation around boundary surfaces. Thus, the flight characteristics of aircraft are determined in a large part by the circulation around the wing surfaces. Of particular interest in such cases is the formation of vortices. Such are accompanied by increased energy consumption, development of noise and place on the designer more stringent requirements as to mechanical strength and corrosion resistance. The same generally applies to all obstacles in a flow path having boundary surfaces around which circulation takes place. For example, such occurs in other types of vehicles, ship's propellers, generators, blowers and pumps. Thus, in properly designing these devices to minimize turbulance and formation of eddies and vortices suitable methods are needed to observe the flow at the boundary surfaces.

Various means have developed for making such flow measurements. Probes have been develop which permits surveillance of the flow field on a point by point basis. Such a method, however, is time consuming and expensive and cannot be used for fast moving surfaces.

Another method is disclosed in the publication "Archiv fuer Technisches Messen", V 144-3, issue 329, June 1963. As disclosed there, solid particles, liquid dyes or gas bubbles are mixed with a flowing liquid and the trajectories of these solid particles produces a volitle picture of the volume flow. However, the flow at the boundary surfaces themselves cannot be examined in detail.

In the same publication, V, 144-2, issue 328, May 1963, additional methods which have been developed for making a gas flow visible are described. For example, a method in which wool or silk threads are attached to the boundary surface to obtain a rough picture of the flow situation is described. In another method a liquid containing fine particles is placed on the boundaries layers. With the boundaries placed on the flow path of air, for example, the liquid evaporates and the particles arrange themselves along the boundary lines in the form of flow lines. Since a moistened surface dries faster if a stronger stream flows over it, it is possible to record in accordance with another method, drying profiles which represent the flow profile. Thus, for example, a white layer of Kaolin, for example, can be applied which becomes transparent when moistened with the liquid of the same index of refraction such as iosafrol. When exposed to a gas stream, the liquid quickly sublimates in the areas of turbulent flow and the white color reappears. In addition to these physical methods chemical processes are also described in the above references. For example, the surface can be coated with a coat containing lead carbonate and then exposed to a gas stream containing hydrogen sulfide. This causes flow lines to appear. Furthermore, the surface may be prepared with starch iodide and a gas stream containing chlorine directed over the surface to cause an iodine starch reaction which is of a strength in proportion to the flow patterns.

Another chemical method is disclosed in U.S. Pat. No. 3,767,874. Here an indicator layer is applied to the boundary layer and the gas stream contains a reactive agent so that the gas flow is indicated by the coloring of the surface. U.S. Application Ser. No. 269,746 employs a layer of anodically oxidized aluminum, e.g. a self-adhering anodized foil, on the boundary layer. An air stream mixed with reactive agents is blown against the boundary. When the aluminum foil is subsequently stained the surface accepts the stain to a different degree in accordance with the extent to which it was attacked by the agents to result in a high contrast color pattern.

A photo-chemical method is taught in U.S. Pat. No. 3,774,225. In the disclosed method a photo-gelatin film is placed on the boundary layers and is moistened. A gas stream enriched with a photographic developer substance is directed over the boundary surface. The photo-gelatin layer is attacked by the developer in dependence in the degree of moisture of the layer and a drying profile produced on the layer which is subsequently further processed and made visible using known methods.

In each of these methods which have been developed for measuring and recording gas flow, the boundary surface is first prepared by applying special layers. With these prefabricated layers, such as aluminum foil or photo-gelatin film, the boundary surface geometry which can be accommodated is limited. Furthermore, it is not possible to use these methods with parts which rotate at extremely fast speeds. This is due to the centrifical forces which occur in such parts and lead to a separation of the applied layers from the boundary surfaces. Furthermore, these methods are all limited to measuring gas flow and cannot be applied to the measurement of liquid flow. In view of this, the need for an improved method which permits measuring liquid flow and which can be used with parts rotating at high speeds and can be applied to any geometry becomes evident.

SUMMARY OF THE INVENTION

The present invention provides such a method. In accordance with the present invention the boundary surfaces are coated with an attackable layer of lacquer and a substance which attacks the lacquer is dissolved in a liquid stream which is directed over the boundary surfaces.

In general terms, the substance which chemically acts on the lacquer layer may do so by dissolving, decomposing, bleaching or reacting in some other manner. It is preferable that the lacquer which is used be capable of being sprayed on the surface so that it can easily cover all geometries.

In accordance with a preferred embodiment of the present method, a lacquer which may be etched differently after different light exposures, e.g. a photo-resist, is used. A layer of this lacquer is subjected to a preliminary exposure to light and subsequently exposed to the flow of a liquid which has been enriched with a substance which will attack this lacquer.

Photoresists are commercially available and widely used in photolithography, particularly in the fabrication of printed circuits and integrated semiconductor circuits. Such lacquers consists, for example, of polymers whose resistance to entchants depends on the duration and intensity of a preliminary exposure to light. There are available positive lacquers which are resistant in the unexposed condition and can be more easily etched the stronger they are pre-exposed. Also available are negative lacquers which become more resistant the stronger the pre-exposure. In the method according to the present invention, the use of such lacquers is particularly advantageous since the etching speed can be varied by the intensity of the exposure and the concentration of the etching agent in the liquid flow and can be adapted to the time for the test in such a manner that the lacquer is just barely attacked during the flow test by a slow laminar flow whereas faster flow and turbulence leaves halos and more deeply etched traces on the lacquer. Upon completion of the flow experiment, the boundary surface is dried and exhibits a permanent picture of the liquid flow.

DETAILED DESCRIPTION OF THE PREFERRED EMBODIMENT

Figure 1:
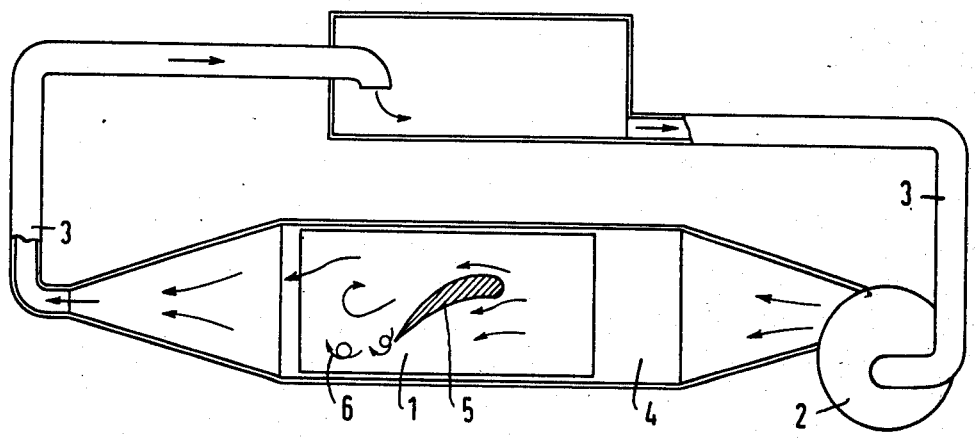
FIG. 1 is a schematic illustration of apparatus for carrying out the method of the present invention.
Figure 2:
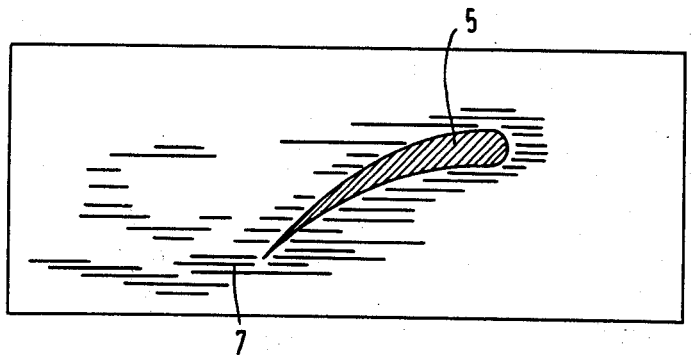
FIG. 2 is a plan view of a plate on which a record of liquid flow has been obtained using the method of the present invention.

FIGS. 1 and 2 are helpful in illustrating an example of the method of the present invention. A plate 1 has mounted thereto a flow obstacle 5 at whose boundary surfaces fluid flow is to be investigated. The boundary surfaces of the obstacle 5 and/or the plate 1 are sprayed with a photolithographic positive lacquer and subjected to a preliminary exposure in daylight. The plate 1 and obstacle 5 are then disposed in a test channel 4 having at its inlet a pump 2 for driving a liquid through the test channel. Liquid is returned to the pump through a piping system in the form of a closed loop 3. A stream of water containing a etching agent which attacks the photoresist is driven through the test channel 4 by the pump 2.

A photoresist which may be used for this purpose is the positive lacquer spray "Positive 20" manufactured by "Kontakt Chemie Rastatt" which is attacked by alkali, e.g. caustic soda. With a concentration of 3.5 g/l caustic soda in water a layer 0.1 mm thick of lacquer sprayed on to the plate 1, the treated surface can be exposed to daylight such as that found in a laboratory for about 30 minutes. With such a layer thickness and exposure and concentration of alkali, distinct etch traces on the lacquer after a test time of 20 minutes, the traces, caused by etching due to the caustic soda dissolved in the water, will result. So long as direct exposure to sunlight is avoided, it is not necessary to darken the laboratory. The lacquer within the test channel 4 which will be made of a light transparent material, e.g. transparent plastic, will be exposed to additional light during the experiment.

In the illustrated example the flow obstacle 5 is aircraft wing model with flow incident from the front. In this example it was not the flow on the boundary surfaces of the wing itself which was to be investigated, but the circulation depicted by arrows 6 in a plane parallel to the flow direction and perpendicular to the airplane wing model. Thus, the wing model was mounted to a plate 1 made of acrylic plastic with the side facing the model being the boundary surface of interest and being sprayed with lacquer. The results of the test conducted on such a plate in the manner described above are illustrated by FIG. 2. The picture shown thereon is what would result from a contact copy of the acrylic plate 1 after etching. The etch traces 7 of the liquid flowing around the wind model 5 which appear bright, are reproduced by shading. Particularly noticeable is the "vortex channel" well known in aerodynamics and located behind the wing.

Thus, in the example given the method of the present invention was used to record a longitudinal cross section through the bulk flow around an obstacle. The method can also be used to advantage to make visible and record the formation of vortices and the flow conditions in channels with curved boundary walls. In such a case a layer of lacquer is applied to the channel walls in simple manner by first sending liquid lacquer through the channels or by immersing the test piece containing the channels in liquid lacquer and subsequently letting the excess lacquer drip off.

The method can also be used to particular advantage to record, for obstacles with circulation around them, the flow conditions which prevail at the surface of the obstacle itself. For example, it is important in the case of curved impellers rotating at high speeds to observe the vortices that may form at the blade surface. This permits preventing the formation of such vortices by changing the shape of the impellers. Since the layer of lacquer is sprayed on and adheres well to the substrate, the method is applicable even to these boundary surfaces which rotate at high speed and which have complex geometries.

Thus, an improved method for measuring and recording liquid flow at boundaries has been shown. Although a specific embodiment has been illustrated and described, it will be obvious to those skilled in the art that various modifications may be made without departing from the spirit of the invention which is intended to be limited solely by the appended claims.

I claim:

1. A method for recording stationary liquid flow patterns at boundary surfaces comprising:
   a. coating the boundary surface at which flow is to be recorded with an attackable layer of lacquer;
   b. dissolving a substance which attacks the lacquer layer in a liquid;
   c. directing said liquid over said boundary surfaces.

2. The method according to claim 1 wherein said lacquer is sprayed onto said boundary surfaces.

3. The method according to claim 1 wherein said lacquer is a photoresist is etched differently for exposures to light and further including the step of pre-exposing said lacquer before passing said liquid over said boundary surfaces and wherein the substance added to said liquid stream is a substance which will etch said lacquer layer.

4. The method according to claim 3 wherein said lacquer is sprayed onto said boundary surfaces.

* * * * *